(12) United States Patent
Shen et al.

(10) Patent No.: US 8,260,077 B2
(45) Date of Patent: Sep. 4, 2012

(54) METHOD AND APPARATUS FOR ELIMINATING IMAGE BLUR

(75) Inventors: Yun-Hung Shen, Hsin-Chu (TW); Hsin-Chuan Lin, Hsinchu (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 1296 days.

(21) Appl. No.: 11/875,963

(22) Filed: Oct. 22, 2007

(65) Prior Publication Data

US 2008/0123987 A1    May 29, 2008

Related U.S. Application Data

(60) Provisional application No. 60/867,590, filed on Nov. 29, 2006.

(51) Int. Cl.
*G06K 9/40* (2006.01)
*H04N 7/18* (2006.01)

(52) U.S. Cl. ........ 382/274; 382/254; 382/255; 382/275; 348/154; 348/155; 348/208.1; 348/607

(58) Field of Classification Search .................. 382/255, 382/254, 274, 275; 348/154, 155, 208.1, 348/607
See application file for complete search history.

(56) References Cited

U.S. PATENT DOCUMENTS

| | | | | |
|---|---|---|---|---|
| 4,499,494 A | * | 2/1985 | Dischert et al. | 348/677 |
| 5,808,697 A | * | 9/1998 | Fujimura et al. | 348/672 |
| 6,148,103 A | * | 11/2000 | Nenonen | 382/169 |
| 6,781,636 B2 | * | 8/2004 | Stessen | 348/672 |
| 7,050,501 B2 | * | 5/2006 | Alvarez | 375/240.16 |
| 7,194,701 B2 | * | 3/2007 | Stavely et al. | 715/838 |
| 7,542,619 B2 | * | 6/2009 | Toyooka et al. | 382/260 |
| 7,567,299 B2 | * | 7/2009 | Sawa | 348/607 |
| 7,769,089 B1 | * | 8/2010 | Chou | 375/240.29 |
| 2004/0036704 A1 | * | 2/2004 | Han et al. | 345/690 |
| 2006/0044472 A1 | | 3/2006 | Lee | |
| 2007/0053606 A1 | * | 3/2007 | Ali | 382/274 |

FOREIGN PATENT DOCUMENTS

| CN | 1599419 A | 3/2005 |
|---|---|---|
| KR | 1020050011141 | 1/2005 |

OTHER PUBLICATIONS

Onogi et al., "Mosaicing and Restoration from Blurred Image Sequence Taken with Moving Camera", ICAPR 2005, LNCS 3687, pp. 598-607, 2005.*

* cited by examiner

*Primary Examiner* — Matthew Bella
*Assistant Examiner* — Jose M Torres
(74) *Attorney, Agent, or Firm* — Winston Hsu; Scott Margo

(57) ABSTRACT

A method for eliminating image blur, includes: performing motion detection on two successive images of a video signal to generate a motion index; and adjusting the luminance of the two successive images according to two transfer functions determined by the motion index, respectively.

21 Claims, 5 Drawing Sheets

METHOD AND APPARATUS FOR ELIMINATING IMAGE BLUR

CROSS REFERENCE TO RELATED APPLICATIONS

This application claims the benefit of U.S. provisional application No. 60/867,590, which was filed on Nov. 29, 2006 and is entitled "METHOD AND APPARATUS FOR REDUCING IMAGE BLUR".

BACKGROUND OF THE INVENTION

1. Field of the Invention

The claimed invention relates to solutions of motion image blur of hold type display devices, and more particularly, to methods and apparatuses for eliminating image blur.

2. Description of the Prior Art

For hold type display devices such as active matrix liquid crystal displays (AMLCDs), motion image blur has been a widely discussed issue. The causes of motion image blur comprise over-long response time of liquid crystal, capacitance variation of pixels, and so-called "sample and hold artifact".

According to the prior art, the image blur problem related to the former two causes can be solved by utilizing a method such as voltage overdrive. However, due to the combination of the sampling characteristics of AMLCDs and the smooth motion tracking characteristics of users' visual systems, it is not easy to conquer the image blur problem related to the last cause, so the corresponding drawback still exits universally in liquid crystal displayers (LCDs) launched on the market. According to the prior art, solutions to "sample and hold artifact" are not perfect. For example, a prior art solution is to destroy the effect of sample and hold artifact by intermittently replacing data of a portion of images with data of all-black images to break visual continuity. Further taking another prior art solution as an example, the solution is to destroy the effect of sample and hold artifact by intermittently turning off the power of the backlight of LCD panels to break visual continuity. However, the prior art solutions both introduce a new problem of decreased overall luminance of images.

In addition, the solutions provided by the prior art usually need a very complicated mechanism and have a very high R&D/manufacturing cost. Therefore, these solutions are not suitable for being led in and applied to the products on the market.

SUMMARY OF THE INVENTION

It is therefore an object of the claimed invention to provide methods and devices for eliminating image blur to solve the above-mentioned problem.

It is another objective of the claimed invention to provide methods and devices for eliminating image blur to solve the problem of motion image blur of hold type display devices.

It is another objective of the claimed invention to provide methods and devices for eliminating image blur to handle the problem of sample and hold artifact of displayed images of display devices.

According to one embodiment of the claimed invention, a method for eliminating image blur is disclosed. The method comprises: performing motion detection on two successive images of a video signal to generate a motion index; and adjusting the luminance of the two successive images according to two transfer functions determined by the motion index, respectively.

While providing the method mentioned above, the claimed invention further provides a device for eliminating image blur. The device comprises: a motion detector, for performing motion detection on two successive images of a video signal to generate a motion index; and an adjustment circuit, coupled to the motion detector, for adjusting the luminance of the two successive images according to two transfer functions determined by the motion index, respectively.

The claimed invention further provides a method for eliminating image blur. The method comprises: performing motion detection on two successive images of a video signal to generate a motion index; and adjusting the luminance of the two successive images according to the motion index, respectively, where the luminance of one of the two successive images is increased while the luminance of the other of the two successive images is decreased.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
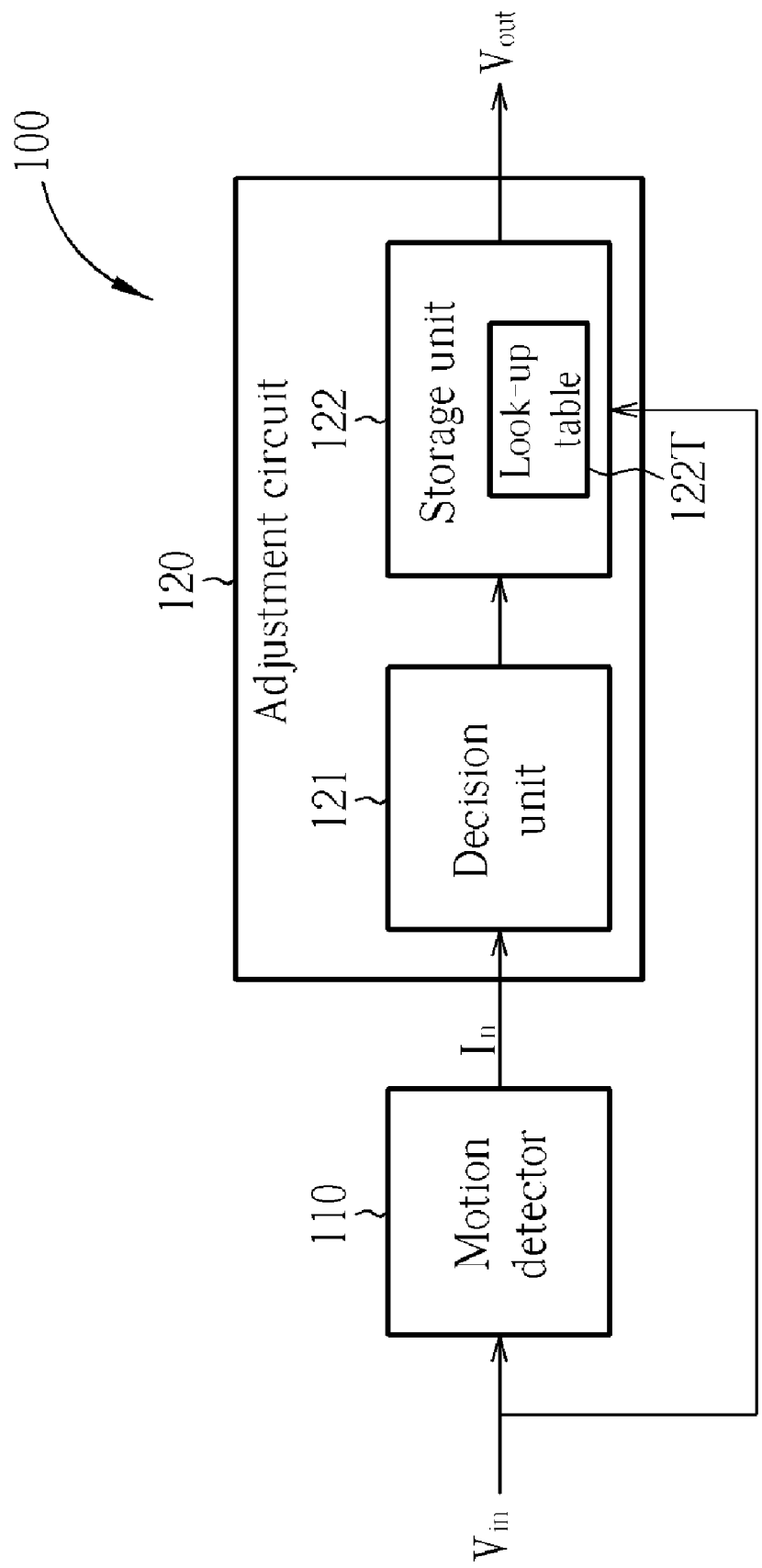
FIG. 1 is a diagram of a device for eliminating image blur according to an embodiment of the claimed invention.

Please refer to FIG. 1. FIG. 1 is a diagram of a device 100 utilized for reducing or eliminating image blur according to a first embodiment of the claimed invention, where the device 100 of this embodiment can be installed in a hold type display device such as an active matrix liquid crystal display (AM-LCD), and is capable of reducing or eliminating image blur of the hold type display device, and more particularly, is capable of reducing or eliminating the sample and hold artifact mentioned above.

As shown in FIG. 1, the device 100 comprises a motion detector 110 and an adjustment circuit 120, while the adjustment circuit 120 comprises a decision unit 121 and at least a storage unit 122. According to this embodiment, the storage unit 122 is a memory storing data of a plurality of sets of transfer functions, where the storage unit 122 of this embodiment stores at least a look-up table (LUT) 122T utilized for representing the transfer functions, so the storage unit 122 is capable of providing the adjustment circuit 120 with the transfer functions by utilizing the LUT 122T.

Figure 2:
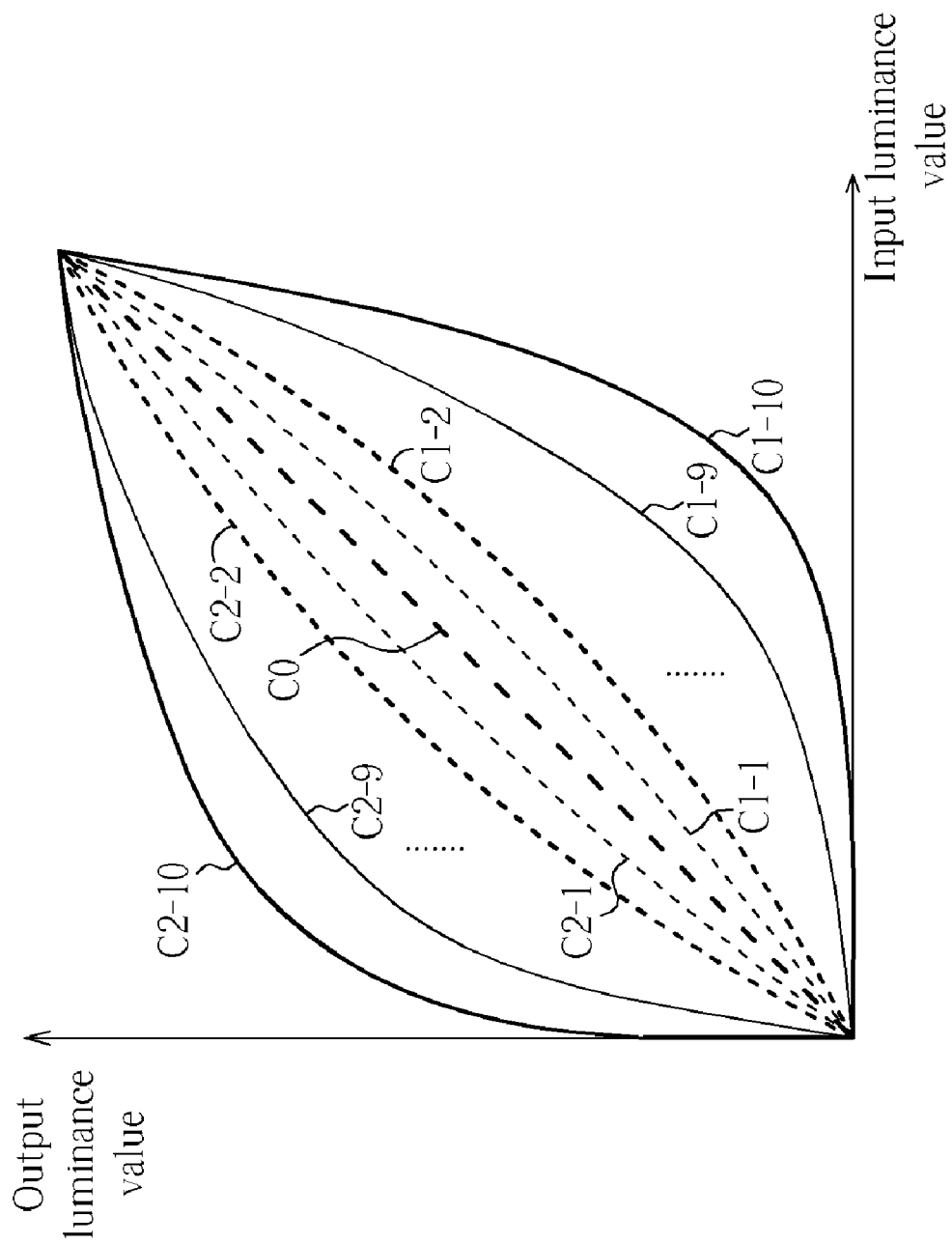
FIG. 2 is a diagram of transfer functions capable of being utilized by the adjustment circuit shown in FIG. 1.

Please refer to FIG. 2. FIG. 2 is a diagram of an initial transfer function C0 and a plurality of sets of transfer functions (C1-1, C2-1), (C1-2, C2-2), ..., and (C1-10, C2-10) capable of being utilized by the adjustment circuit 120 shown in FIG. 1, where the initial transfer function C0 is utilized for displaying static images. In this embodiment, each set of transfer functions (C1-$j$, C2-$j$) ($j$=1, 2, ..., or 10 in this embodiment) comprise a first transfer function C1-$j$ and a second transfer function C2-$j$, and each transfer function is utilized for converting an input luminance value to an output luminance value. The plurality of sets of transfer functions can be properly determined by trial and error experiments in advance, so that regarding the same input luminance value, the average of output luminance values generated according to the first transfer function C1-$j$ and the second transfer function C2-$j$ is close to or equal to the original input luminance value. In another embodiment, which is a variation of the first embodiment, regarding the same input luminance value, the average of output luminance values generated according to the first transfer function C1-$j$ and the second transfer function C2-$j$ can be the input luminance value generated according to the initial transfer function C0.

It is noted that, according to a variation of this embodiment, the curve of the initial transfer function C0 is not a straight line, and each set of transfer functions (C1-$j$, C2-$j$) can be properly determined by trial and error experiments in advance, so that regarding the same input luminance value, the average of output luminance values generated according to the first transfer function C1-$j$ and the second transfer function C2-$j$ is close to or equal to the luminance value generated according to the initial transfer function C0.

According to the first embodiment, the motion detector 110 is capable of performing motion detection on two successive images of a video signal Vin to generate a motion index In, where the magnitude of the motion index In corresponds to a motion level of at least one object within the two successive images. According to an implementation choice of this embodiment, the motion detection can be performed by computing the difference between the average luminance of pixel values of all pixels within a frame and the average luminance of pixel values of all pixels within another frame (e.g. the next frame). The more the difference, the more intense the motion is. According to another implementation choice of this embodiment, the motion detection can be performed by utilizing edge difference detection. The more the difference, the more intense the motion is.

In addition, the adjustment circuit 120 of this embodiment is capable of determining a set of transfer functions (e.g., one set of transfer functions out of the plurality of sets of transfer functions (C1-1, C2-1), (C1-2, C2-2), . . . , and (C1-10, C2-10)) according to the motion index In generated by the motion detector 110, in order to respectively adjust the luminance of two successive images within the video signal Vin, so the image blur of the image can be reduced or eliminated. More particularly, in this embodiment, the adjustment circuit 120 is capable of respectively adjusting the luminance of two successive images within the video signal Vin by utilizing two transfer functions of the set of transfer functions corresponding to the motion index In according to the table values representing the set of transfer functions corresponding the motion index In within the LUT 122T.

For example, if the set of transfer functions corresponding to the motion index In is (C1-10, C2-10), the adjustment circuit 120 is capable of respectively adjusting the luminance of two images of frames F(n) and F(n+1) by utilizing the two transfer functions C1-10 and C2-10, where the transfer function C1-10 is utilized for decreasing the luminance of one of the two images (e.g. the image of the frame F(n)) while the transfer function C2-10 is utilized for increasing the luminance of the other image of the two images (e.g. the image of the frame F(n+1)). As the cause of the sample and hold artifact is closely related to the visual continuity, and as the luminance adjustment mechanism of this embodiment not only breaks the visual continuity but also performs the adjustment of increasing the luminance of one of each two successive images and decreasing the luminance of the other of the two successive images when adjusting the luminance, the claimed invention is capable of reducing or eliminating the above-mentioned sample and hold artifact while the proper average luminance is still maintained without having the problem of decreased overall luminance of images as seen in the prior art.

In this embodiment, the transfer functions can be gamma transfer functions corresponding to respective gamma values, where the decision unit 121 is capable of determining a set of gamma values according to the motion index In, and utilizing the set of gamma values to represent the set of transfer functions corresponding the motion index In, respectively. Therefore, the adjustment circuit 120 of this embodiment substantially selects the set of transfer functions corresponding to the set of gamma values (i.e., the set of transfer functions corresponding to the motion index In) according to the motion index In to adjust images. Please note that the motion index In can be utilized for representing the aforementioned motion level, where the motion level comprises a motion range, a motion speed, or a motion vector of the object. When the motion level represented by the motion index In becomes more intense, the adjustment circuit 120 of this embodiment adjusts images according to a set of transfer functions with a larger difference (e.g. (C1-10, C2-10)), where the set of transfer functions with the larger difference mentioned above correspond to a set of gamma values with a larger difference in this embodiment. Conversely, when the motion level represented by the motion index In becomes slighter, the adjustment circuit 120 of this embodiment adjusts images according to a set of transfer functions with a smaller difference (e.g. (C1-1, C2-1)), where the set of transfer functions with the smaller difference mentioned above correspond to a set of gamma values with a smaller difference in this embodiment. Additionally, if the motion level represented by the motion index In indicates that the images detected by the motion detector 110 are static images, the adjustment circuit 120 of this embodiment performs transformation according to the initial transfer function C0.

According to an implementation choice of this embodiment, the decision unit 121 is capable of selecting the set of transfer functions corresponding to the motion index In from the plurality of sets of transfer functions. According to another implementation choice of this embodiment, the decision unit 121 is capable of performing interpolation operations according to at least a set of transfer functions within the plurality of sets of transfer functions, in order to generate the set of transfer functions corresponding to the motion index In. Thus, the number of sets of transfer functions utilized by the adjustment circuit 120 can be greater than the number of sets of transfer functions stored in the storage unit 122 (e.g. 10 sets in this embodiment).

According to a variation of this embodiment, the aforementioned plurality of sets of transfer functions (C1-1, C2-1), (C1-2, C2-2), . . . , and (C1-10, C2-10) do not have to be all stored in the storage unit 122. The storage unit 122 of this variation stores a single set of transfer functions such as (C1-10, C2-10), and the adjustment circuit 120 of this variation is capable of generating the set of transfer functions corresponding to the motion index In according to the single set of transfer functions (C1-10, C2-10) (i.e. the original transfer functions) and the motion index In. In this variation, the value the motion index In can be 0, 1, 2, . . . , or 10, and the adjustment circuit 120 is capable of adjusting curve parameters corresponding to the single set of transfer functions (C1-10, C2-10) (e.g. gamma values) according to the motion index In, in order to generate other sets of transfer functions (C1-1, C2-1), (C1-2, C2-2), . . . , and (C1-9, C2-9) within the aforementioned plurality of sets of transfer functions (C1-1, C2-1), (C1-2, C2-2), . . . , and (C1-10, C2-10).

In addition, within the LUT 122T of the first embodiment, the number of table values corresponding to each transfer function can be 256. According to a variation of this embodiment, within the LUT 122T, the number of table values corresponding to each transfer function can be 64, and the adjustment circuit 120 is capable of generating the other table values of the above-mentioned 256 table values by substituting the 64 table values into some function(s) or by utilizing the 64 table values to perform interpolation operations.

Furthermore, according to a variation of this embodiment, transfer functions respectively corresponding to R/G/B color channels are different, and the adjustment circuit 120 of this variation operates according to respective sets of transfer functions corresponding to R/G/B color channels.

Figure 3:
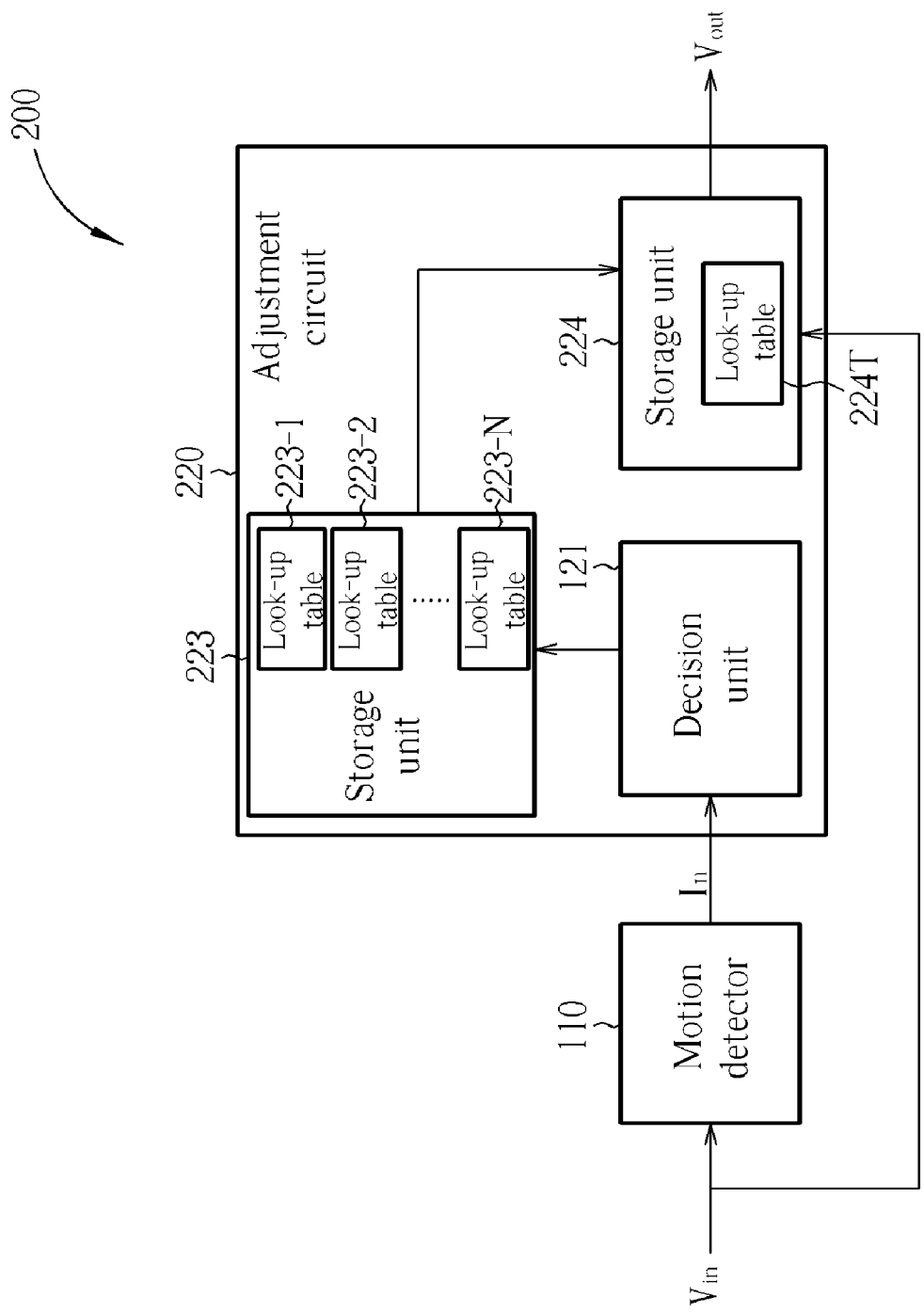
FIG. 3 is a diagram of a device for eliminating image blur according to another embodiment of the claimed invention.

FIG. 3 is a diagram of a device 200 for eliminating image blur provided according to a second embodiment of the claimed invention, where this embodiment is a variation of the first embodiment. In contrast to the above-mentioned adjustment circuit 120, the adjustment circuit 220 of this embodiment comprises two storage units 223 and 224 coupled to the decision unit 121. The storage unit 223 of this embodiment is a memory, and more particularly, is a non-volatile (NV) memory such as an electrically erasable programmable read only memory (EEPROM) or a flash memory. Besides, the storage unit 224 of this embodiment is a memory, and more particularly, is a random access memory (RAM) such as a static RAM (SRAM), where the access speed of the storage unit 224 is greater than that of the storage unit 223.

According to this embodiment, the adjustment circuit 220 is capable of copying data of the set of transfer functions corresponding to the motion index In from the storage unit 223 to the storage unit 224, in order to respectively adjust the luminance of two successive images within the video signal Vin according to the data of the set of transfer functions copied to the storage unit 224. As shown in FIG. 3, the storage unit 223 stores N LUTs 223-1, 223-2, . . . , and 223-N utilized for representing at least N sets of transfer functions, so the adjustment circuit 220 is capable of copying the data of the set of transfer functions corresponding to the motion index In (e.g. at least a portion of table values of one LUT of the N LUTs 223-1, 223-2, . . . , and 223-N) from the storage unit 223 to the storage unit 224, in order to generate a LUT 224T within the storage unit 224. Thus, the storage unit 224 provides the adjustment circuit 220 with the set of transfer functions corresponding to the motion index In by utilizing the LUT 224T. Similar descriptions of this embodiment in contrast to the first embodiment are not repeated in detail.

Figure 4:
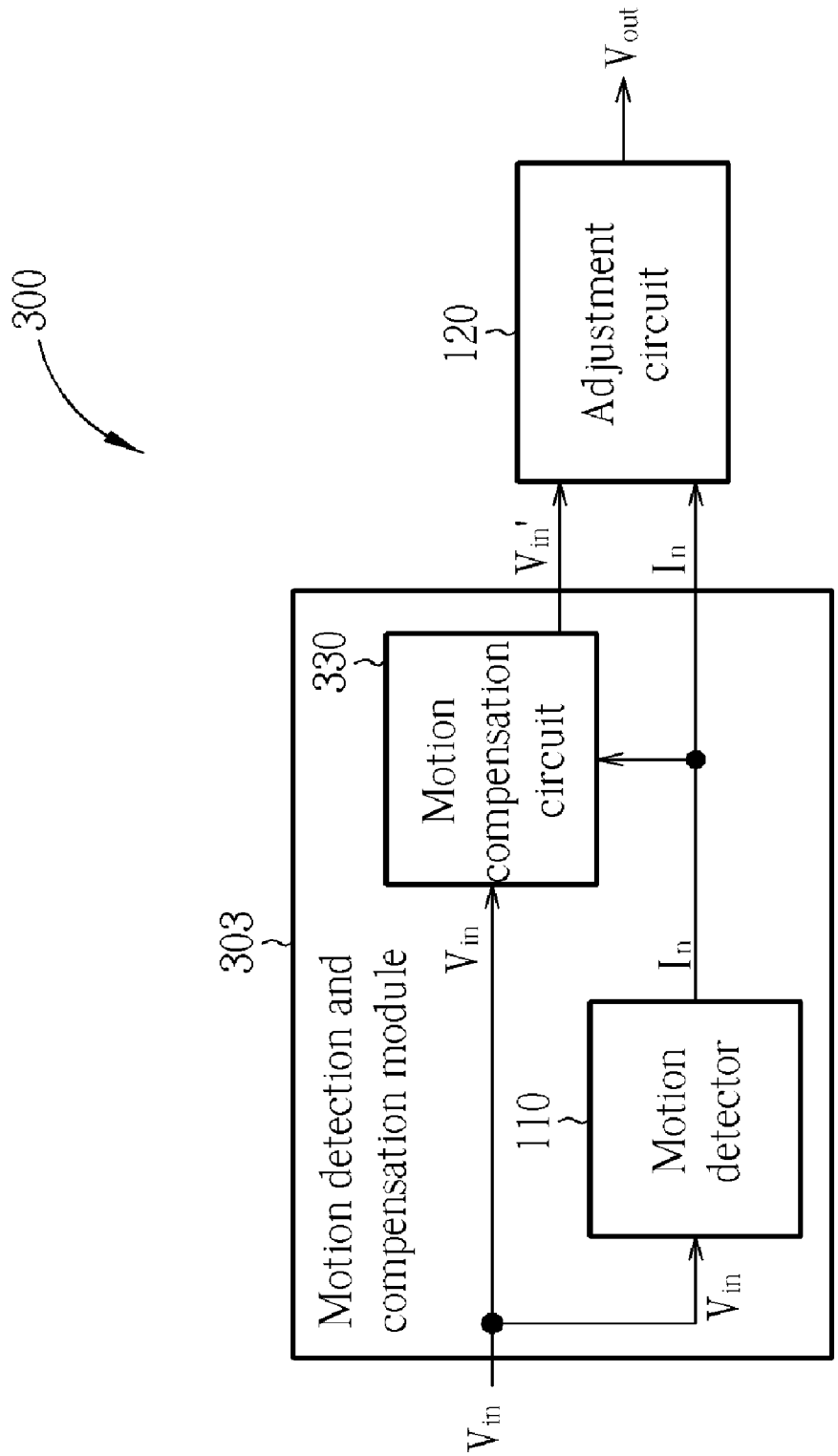
FIG. 4 is a diagram of a device for eliminating image blur according to another embodiment of the claimed invention.

FIG. 4 is a diagram of a device 300 for eliminating image blur provided according to a third embodiment of the claimed invention, where this embodiment is also a variation of the first embodiment. In contrast to the device 100 mentioned above, the device 300 comprises a motion detection and compensation module 303, which comprises the motion detector 110 mentioned above and a motion compensation circuit 330, for performing motion compensations according to the motion index In and for outputting at least one compensated image to the adjustment circuit 120 through another video signal Vin' corresponding to the video signal Vin. Thus, the adjustment circuit 120 is capable of respectively adjusting the luminance of two successive compensated images within the video signal Vin' according to the set of transfer functions corresponding to the motion index In, in order to reduce or eliminate image blur of the image. Similar descriptions of this embodiment in contrast to the first embodiment are not repeated in detail.

According to variations of the embodiments mention above, the output video signal Vout of the adjustment circuit 120 or the adjustment circuit 220 is capable of being transmitted to a dithering operation circuit (not shown) for further processing, and then output to the display module of the hold type display device (e.g. an LCD panel) through an overdrive circuit (not shown) for displaying.

Figure 5:
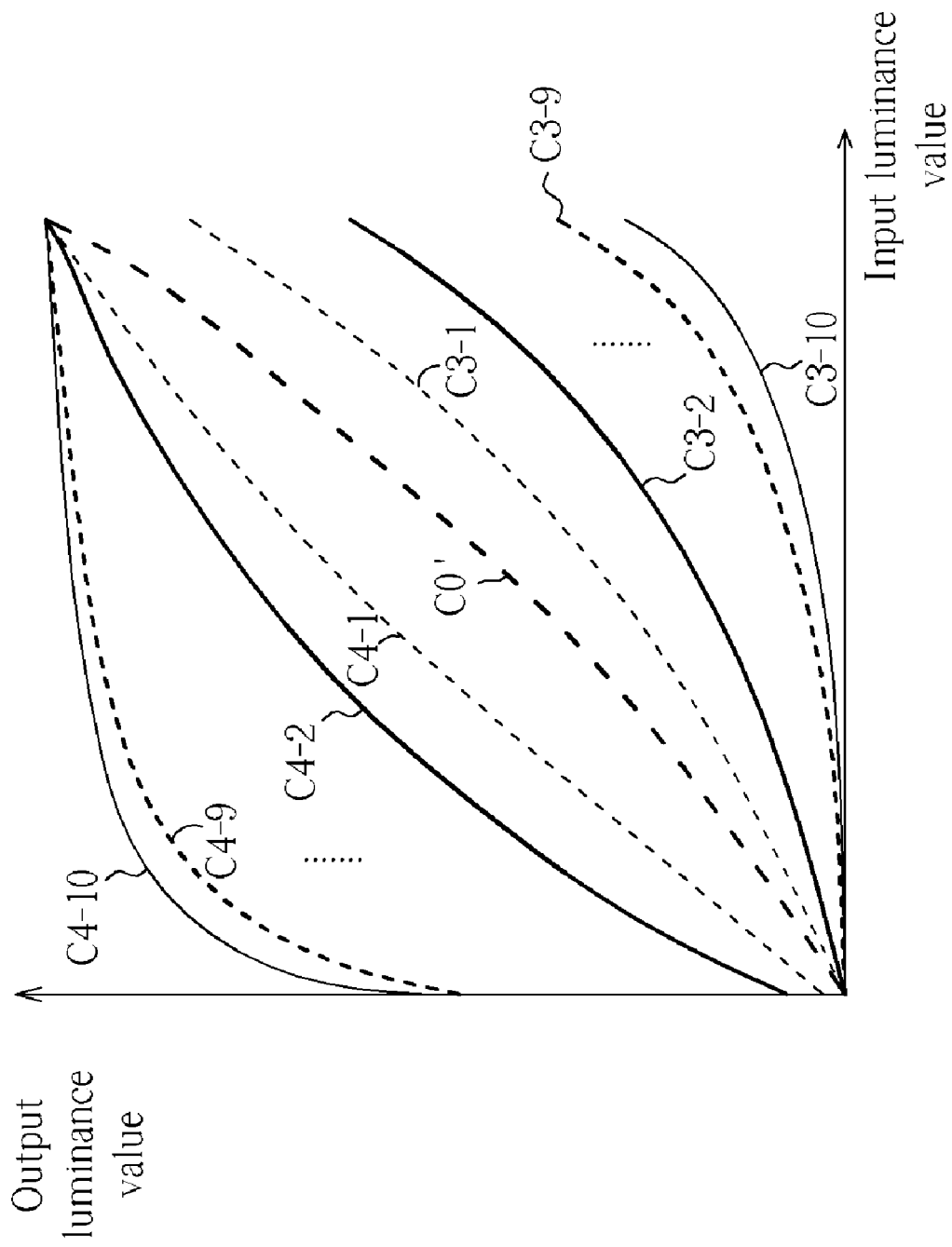
FIG. 5 is a diagram of transfer functions provided by another embodiment of the claimed invention.

FIG. 5 is a diagram of an initial transfer function C0' and a plurality of sets of transfer functions (C3-1, C4-1), (C3-2, C4-2), . . . , and (C3-10, C4-10) provided according to another embodiment of the claimed invention, where this embodiment is a variation of the embodiment shown in FIG. 2. According to this embodiment, the curve of the initial transfer function C0' is not a straight line. In addition, in contrast to the sets of transfer functions shown in FIG. 2, any of the curves of the ten transfer functions C3-1, C3-2, . . . , and C3-10 below the initial transfer function C0' is separated from the curve of the initial transfer function C0' at the point of the maximal input luminance value, and any of the curves of the ten transfer functions C4-1, C4-2, . . . , and C4-10 above the initial transfer function C0' is separated from the curve of the initial transfer function C0' at the point of the minimal input luminance value, whereby the performance of eliminating image blur in extremely bright or extremely dark areas can be enhanced according to the plurality of sets of transfer functions shown in FIG. 5.

It is an advantage of the claimed invention that the methods and devices provided by the claimed invention are capable of adjusting the luminance of two successive images of a video signal according to a set of transfer functions corresponding to a motion index, to reduce or eliminate the image blur of the image, and more particularly, to reduce or eliminate the sample and hold artifact. Therefore, by applying the adjustment(s) performed according to the embodiments of the claimed invention, annoying phenomena such as distorted luminance or insufficient luminance of images observed by users will not happen.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for eliminating image blur, comprising:
   performing motion detection on two successive images of a video signal to generate a motion index; and
   adjusting the luminance of the two successive images according to two transfer functions determined by the motion index, respectively;
   wherein one of the two transfer functions is utilized for increasing the luminance of images, and the other of the two transfer functions is utilized for decreasing the luminance of images; and each of the two transfer functions is utilized for converting an input luminance value to an output luminance value; and regarding the same input luminance value, an average of two output luminance values respectively generated by utilizing the two transfer functions is close to a corresponding input luminance value.

2. The method of claim 1, wherein the two transfer functions are selected from a group of predetermined transfer functions.

3. The method of claim 1, wherein the two transfer functions are generated by performing operations on a set of original transfer functions according to the motion index.

4. The method of claim 3, wherein the two transfer functions are generated by performing interpolation operations on the set of original transfer functions.

5. The method of claim 1, wherein the two transfer functions are utilized for generating a corresponding look-up table (LUT) so that the adjustment of the luminance of the two successive images is performed by looking up the LUT.

6. The method of claim 5, wherein the LUT is stored in a memory.

7. The method of claim 1, wherein the transfer functions are gamma transfer functions corresponding to respective gamma values.

8. The method of claim 1, wherein the value of the motion index corresponds to a motion level of at least one object within a detected image of the motion detection.

9. A device for eliminating image blur, comprising:
a motion detector, for performing motion detection on two successive images of a video signal to generate a motion index; and
an adjustment circuit, coupled to the motion detector, for adjusting the luminance of the two successive images according to two transfer functions determined by the motion index, respectively;
wherein one of the two transfer functions is utilized for increasing the luminance of images, and the other of the two transfer functions is utilized for decreasing the luminance of images; and each of the two transfer functions is utilized for converting an input luminance value to an output luminance; and regarding the same input luminance value, an average of two output luminance values respectively generated by utilizing the two transfer functions is close to a corresponding input luminance value.

10. The device of claim 9, wherein the two transfer functions are generated by performing operations on a set of original transfer functions according to the motion index.

11. The device of claim 10, wherein the two transfer functions are generated by performing interpolation operations on the set of original transfer functions.

12. The device of claim 9, wherein the two transfer functions are selected from a group of predetermined transfer functions.

13. The device of claim 12, wherein the adjustment circuit comprises:
a storage unit, for storing a look-up table (LUT) corresponding to the transfer functions so that the adjustment of the luminance of the two successive images is performed by looking up the LUT.

14. The device of claim 13, wherein the adjustment circuit further comprises:
a decision unit, coupled to the motion detector, for selecting the two transfer functions from the group of predetermined transfer functions according to the motion index.

15. The device of claim 12, wherein the adjustment circuit comprises:
a first storage unit utilized for storing data of the group of predetermined transfer functions;
a second storage unit utilized for storing the two transfer functions; and
a decision unit, coupled to the motion detector, for selecting the two transfer functions from the group of predetermined transfer functions according to the motion index, and downloading the data of the two transfer functions from the first storage unit to the second storage unit.

16. The device of claim 15, wherein the data of the transfer functions are stored in the form of look-up tables.

17. The device of claim 9, wherein the transfer functions are gamma transfer functions corresponding to respective gamma values.

18. The device of claim 9, further comprising:
a motion compensation circuit, coupled between the motion detector and the adjustment circuit, for performing motion compensation according to the motion index.

19. A method for eliminating image blur, comprising:
performing motion detection on two successive images of a video signal to generate a motion index; and
adjusting the luminance of the two successive images according to the motion index respectively, wherein the luminance of one of the two successive images is increased while the luminance of the other of the two successive images is decreased;
wherein the luminance of the two successive images are adjusted according to two transfer functions determined by the motion index, respectively; and each of the two transfer functions is utilized for converting an input luminance value to an output luminance; and regarding the same input luminance value, an average of two output luminance values respectively generated by utilizing the two transfer functions is close to a corresponding input luminance value.

20. The method of claim 19, wherein the motion index represents a motion range, a motion speed, or a motion vector of an object within the two successive images.

21. The method of claim 20, wherein the larger the motion range, the motion speed, or the motion vector of the object is, the more the difference between the luminance of the two successive images after being adjusted is.

* * * * *